(12) United States Patent  
Wagner

(10) Patent No.: US 8,023,755 B2
(45) Date of Patent: Sep. 20, 2011

(54) GENERATING SUBIMAGES OF AN IMAGE TO USE TO REPRESENT THE IMAGE

(75) Inventor: David Laurence Wagner, Broomfield, CO (US)

(73) Assignee: International Business Machines Corporation, Armonk, NY (US)

(*) Notice: Subject to any disclaimer, the term of this patent is extended or adjusted under 35 U.S.C. 154(b) by 782 days.

(21) Appl. No.: 12/121,720

(22) Filed: May 15, 2008

(65) Prior Publication Data

US 2009/0285495 A1 Nov. 19, 2009

(51) Int. Cl.
*G06K 9/36* (2006.01)
(52) U.S. Cl. ............... 382/243; 382/237; 382/244
(58) Field of Classification Search ......... 382/232–253
See application file for complete search history.

(56) References Cited

U.S. PATENT DOCUMENTS

| | | | |
|---|---|---|---|
| 5,363,098 A | 11/1994 | Antoshenkov | |
| 5,619,591 A * | 4/1997 | Tsang et al. | 382/166 |
| 5,684,895 A * | 11/1997 | Harrington | 382/233 |
| 5,777,749 A * | 7/1998 | Noda et al. | 382/239 |
| 6,640,290 B1 | 10/2003 | Forin et al. | |
| 6,741,746 B2 * | 5/2004 | Epstein et al. | 382/233 |
| 6,956,965 B1 * | 10/2005 | Cuijpers | 382/164 |
| 7,035,457 B2 | 4/2006 | Ishibashi | |
| 7,068,398 B2 | 6/2006 | Rijavec | |
| 7,224,843 B2 * | 5/2007 | Jeong | 382/237 |
| 2003/0228062 A1 * | 12/2003 | Jeong | 382/237 |
| 2005/0044094 A1 | 2/2005 | Li et al. | |

FOREIGN PATENT DOCUMENTS

JP 2006279741 A * 10/2006

OTHER PUBLICATIONS

P. Ser et al., "Memory Compression for Straight LIne Recognition Using Hough Transform", Elsevier Science Inc., Pattern Recognition Letters archive, vol. 16, Issue 2, Feb. 1995.
G. Antoshenkov "Byte-Aligned Bitmap Compression", IEEE, Proceedings of the Conference on Data Compression, 1995, p. 476.

* cited by examiner

*Primary Examiner* — Jingge Wu
(74) *Attorney, Agent, or Firm* — David W. Victor; Konrad Raynes & Victor LLP

(57) ABSTRACT

Provided are a method, system, and article of manufacture for generating subimages of an image to use to represent the image. A determination is made of a pixel location on one axis of an image comprising a plurality of pixels. The image is divided into multiple subimages at the determined pixel location on the axis. A determination is made as to whether each subimage can be cropped to remove regions of white pixels from the subimage. Each subimage is cropped to remove a region of white pixels in response to determining that the subimage can be cropped. An image file is generated defining the image including the subimages.

20 Claims, 9 Drawing Sheets

"Smart Tile"

- Finds gaps in the profile
- Splits into subimages
- Crops white pixels from subimages
- Repeats until tile size is below threshold

GENERATING SUBIMAGES OF AN IMAGE TO USE TO REPRESENT THE IMAGE

BACKGROUND OF THE INVENTION

1. Field of the Invention

The present invention relates to a method, system, and article of manufacture for generating subimages of an image to use to represent the image.

2. Description of the Related Art

An image may be represented in different image formats. For instance, in a bitmap format, such as Tagged Image File Format (TIFF), a bitmap data structure includes a bit for every pixel of the image and provides a value for the pixel, such as a white space value, color value, grayscale value, etc. The Image Object Content Architecture (IOCA) file format allows for "sparse" tiles such that the bitmap image 12 can be composed of multiple tiles that can be located at any position and have any size. Areas of the IOCA image that are not covered by a tile are empty (white).

SUMMARY

Provided are a method, system, and article of manufacture for generating subimages of an image to use to represent the image. A determination is made of a pixel location on one axis of an image comprising a plurality of pixels. The image is divided into multiple subimages at the determined pixel location on the axis. A determination is made as to whether each subimage can be cropped to remove regions of white pixels from the subimage. Each subimage is cropped to remove a region of white pixels in response to determining that the subimage can be cropped. An image file is generated defining the image including the subimages.

DETAILED DESCRIPTION

Figure 1:
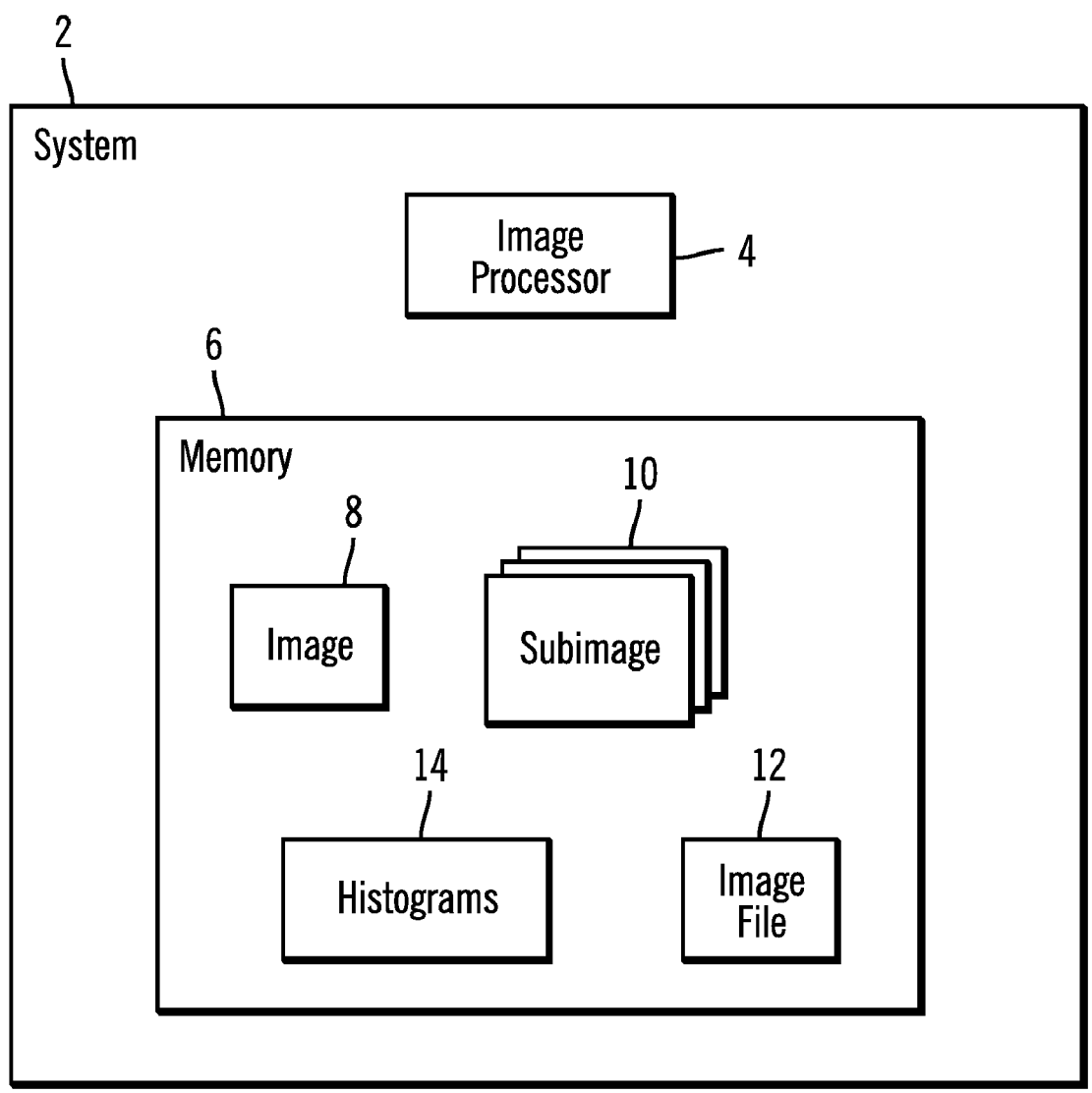
FIG. 1 illustrates an embodiment of a computing environment.

FIG. 1 illustrates an embodiment of a computing environment. A system 2 includes an image processor 4 and a memory 6. The image processor 4 receives as input an image 8, such as a bitmap image, TIFF image, Joint Photographic Experts Group (JPEG) image, etc., and transforms the image into two or more subimages 10 comprising tiles on the image 8 that excludes, where the total space of the subimages 10 may exclude white space in the image 8. The image processor 4 may store the subimages 10 in the image file 12, so that the image file 12 uses less space than the space required to store the image 8 because the image file 12 includes subimages 10 that exclude a significant number of white space pixels from the image 8, thus requiring a fewer number of image pixels to represent the image 8. As part of generating the subimages 10, the image processor 4 may generate and use histograms 14 that provide a distribution of non-white pixels in columns and rows of the image 8 and subimages 10 that extend through pixel locations on a horizontal axis and vertical axis, respectively, of the image 8 and subimages 10. The histograms 14 may comprise structures that include for each pixel location along one axis a number of white pixels at that pixel location. In this way, the image processor 4 scans the histogram 14 and finds the largest gap of white space to split the image 8 or a subimage 10 into two subimages 10 at that location having the greatest number of pixels or a weighted greatest number of white pixels.

The image processor 4 may be implemented by a processor, such as a central processing unit (CPU), executing a program in the memory 6. Alternatively, the image processor 6 may be implemented in a hardware device as hardware logic, such as an application specific integrated circuit (ASIC), or still further a combination of hardware and computer executable software. Further, the image processor 4 may generate an image file 12 comprising a compressed version of the image 8, requiring fewer bits to store the image 8. The image file 12 may be generated as part of a printer test program that generates test images to test a printer. Additionally, the image processor 4 may generate an image file 12 to provide a compressed version of the image 8 that improves performance for transmitting the image file 12 over a network and processing the image file 12 in a printer or other attached output device.

Figure 2:
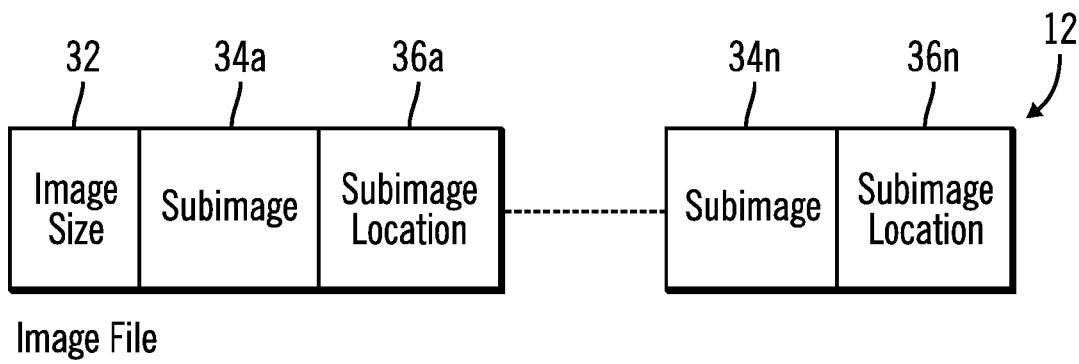
FIG. 2 illustrates an embodiment of an image file format.

FIG. 2 illustrates an embodiment of an image file 12 as including an image size 32 which may be expressed as a number of pixels for the width and height, and multiple subimages 34a . . . 34n each including regions including non-white pixels of the image 8. For each subimage 34a . . . 34n, the image file 12 includes a subimage location 36a . . . 36n indicating a location of the subimage 34a . . . 34n in the image 8. In this way, the image 8 may be reproduced by placing the subimages 34a . . . 34n having the non-white pixels of the image 8 at the specified locations 36a . . . 36n, so that those regions not overlapped by one of the subimages 34a . . . 34n comprises non-white space. Alternatively, the image file 12 may include just one image comprising the entire image 8 if the image 8 cannot be divided into subimages 10 according to the operations performed by the image processor 4. The different subimages 10 may be of different sizes or the same size.

Figure 3:
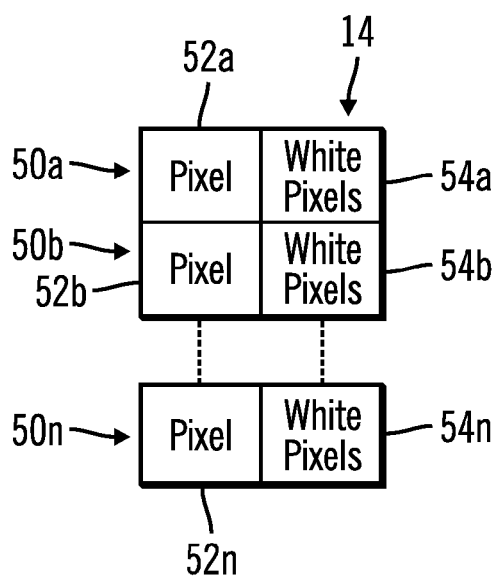
FIG. 3 illustrates an embodiment of a histogram data structure indicating a number of white pixels at pixel locations.

FIG. 3 illustrates an embodiment of a histogram data structure 14 as including a plurality of entries 50a, 50b . . . 50n, where each entry indicates a pixel location 52a, 52b . . . 52n and a number of white pixels 54a, 54b . . . 54n on an axis extending orthogonally through the pixel location. Thus, a vertical and horizontal histograms for an image comprise arrays of integer values of white pixels for each pixel location.

In one embodiment, the image file 12 may conform to the Image Object Content Architecture (IOCA), which allows for "sparse" tiles where the bitmap image 12 can be composed of multiple tiles that can be located at any position and have any size. Areas of the IOCA image that are not covered by a tile are empty (white). The image file 12 may utilize other image file formats that allow tiles or subimages to be stored to represent an image. For instance, the image file format may comprise the Adobe® Portable Document Format (PDF). (Adobe is a trademark of Adobe Systems, Inc. in the United States and foreign countries).

Figure 4A:
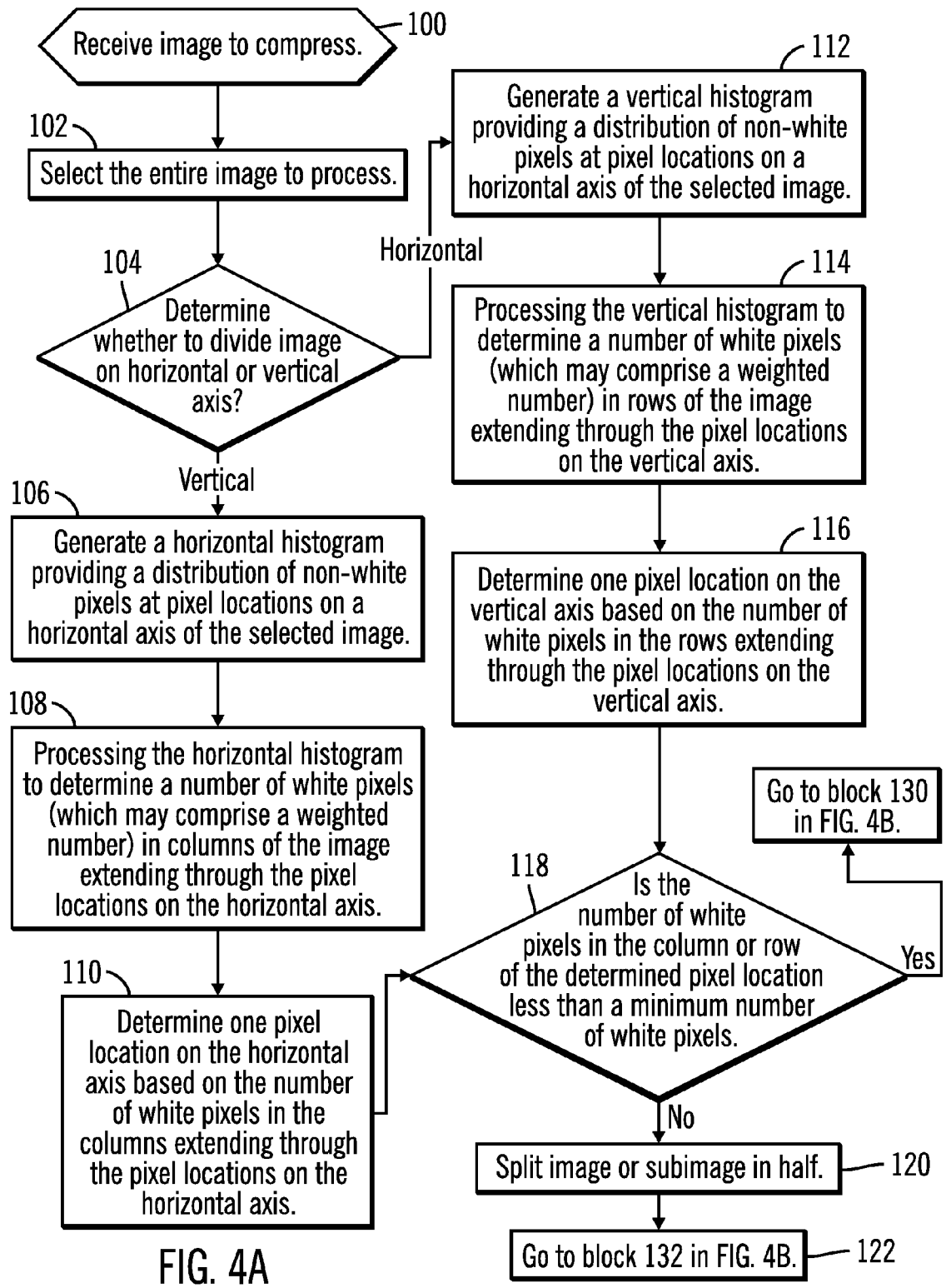
FIGS. 4a and 4b illustrate and embodiment of operations to generate subimages covering regions of non-white pixels of the image.
Figure 4B:
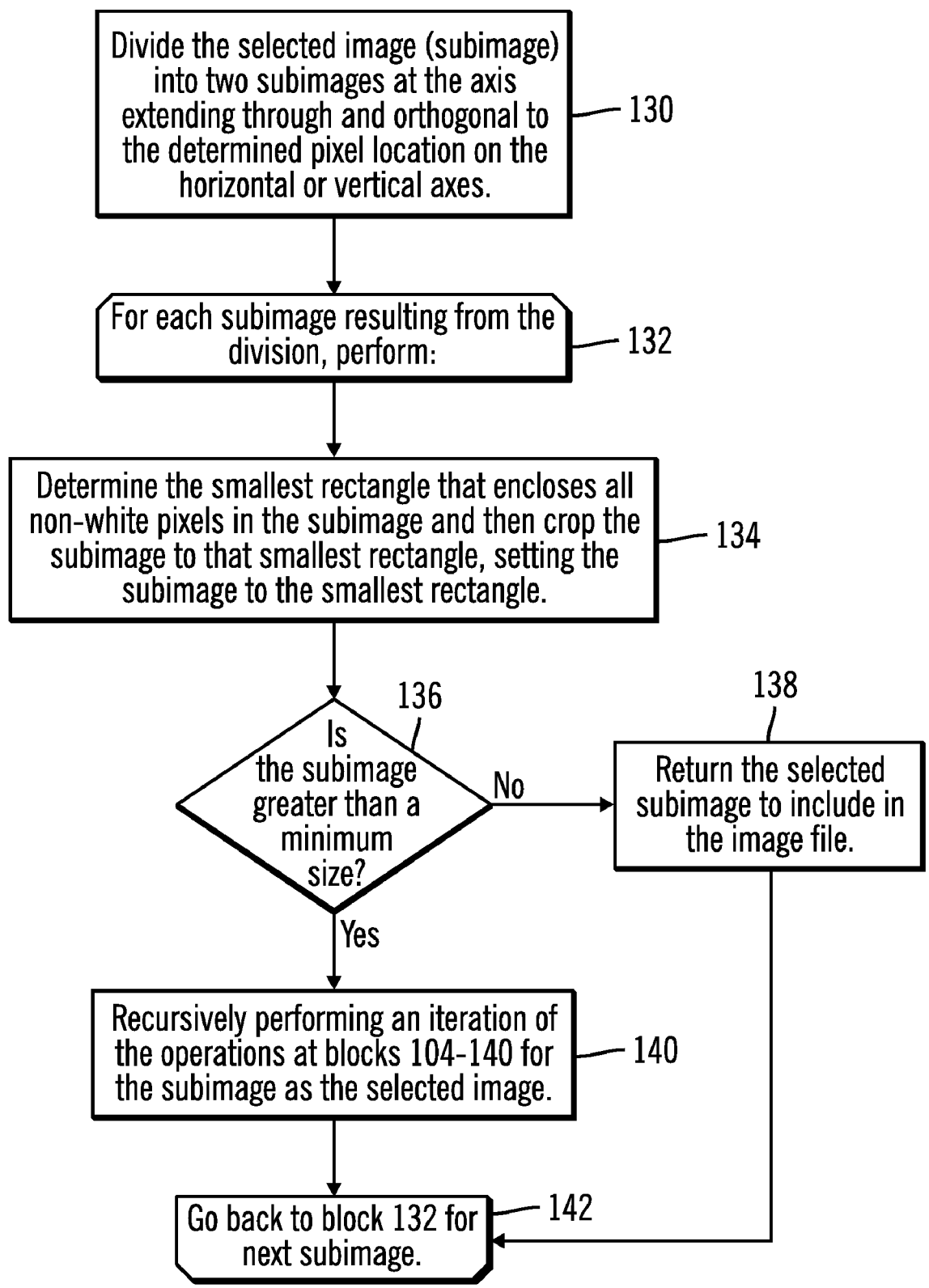

FIGS. 4a and 4b illustrates an embodiment of operations performed by the image processor 4 to generate subimages 10 of the image 8 that together utilize fewer pixels than the image 8 to store in the image file 12. With respect to FIG. 4a, upon receiving (at block 100) an image 8 to compress, the image processor 4 selects (at block 102) the entire image 8 to process. The image processor 4 determines (at block 104) whether to divide the image 8 or subimage 10 on the horizontal or vertical axis. In one embodiment, the determining of whether to divide along the horizontal or vertical axis may involve determining whether a width of the image 8 or subimage 10 being considered is more than a predetermined factor times the height of the selected image 8 or subimage 10. If the width of the image 8 or subimage 10 under consideration is more than the predetermined factor times the height, then the image 8 or subimage 10 is split along a vertical axis extending orthogonally through a determined pixel location on the horizontal axis. If the width is less than the factor times the height, then the image 8 or subimage 10 is split along a horizontal axis extending orthogonally through a determined pixel location on the vertical axis. In one embodiment, the predetermined factor used may be 1.618. This guarantees that tiles will be a rectangle with a width larger than its height, since some image storage algorithms are more efficient storing images that are wider than they are tall. In alternative embodiments, other factors values may be used to compare the width to the height to the image 8 or subimage 10 to which the operations apply.

If (at block 104) the image is to be divided on the vertical axis, then the image processor 4 generates (at block 106) a horizontal histogram 14 (such as horizontal histograms 302 and 312 in FIGS. 7 and 8) providing a distribution of non-white pixels in columns extending through pixel locations on a horizontal axis of the selected image 8 or subimage 10. The histogram 14 may comprise the distribution for all pixel locations on the horizontal or vertical axis. The image processor 4 processes (at block 108) the horizontal histogram 14 to determine a number of white pixels (which may comprise a weighted number) in columns of the image extending through the pixel locations on the horizontal axis. The image processor 4 then determines (at block 110) one pixel location on the horizontal axis based on the number of white pixels in the columns extending through the pixel locations on the horizontal axis. In one embodiment, the image processor 4 may determine the pixel location whose column has a maximum number of white pixels of the columns for the pixel locations to divide the image along the greatest gap or area of white space.

In one embodiment, the number of pixels in the columns may be weighted according to a function, such that the pixel location whose column has the maximum number of weighted white pixels is determined. In one embodiment, the weighting function may provide a greater weight to the number of white pixels in columns or rows closer to the center of the horizontal and vertical axes of the image 8 or subimage 10 being considered and weight lower the number of white pixels closer to the edges. This weighting prefers gaps nearer the center of the distribution than near the edges.

If (at block 104) the image processor 4 determines to divide the image along the horizontal axis, then the image processor 4 generates (at block 112) a vertical histogram 14 (such as vertical histograms 304 and 314 in FIGS. 7 and 8) providing a distribution of non-white pixels in rows of the image extending through pixel locations on a vertical axis of the selected image 8 or subimage 10. The image processor 4 processes (at block 114) the vertical histogram 14 to determine a number of white pixels (which may comprise a weighted number) in rows of the image extending through the pixel locations on the vertical axis. The image processor 4 then determines (at block 116) one pixel location on the vertical axis based on the number of white pixels in the rows extending through the pixel locations on the vertical axis. In one embodiment, the image processor 4 may determine the pixel location whose column has a maximum number (or maximum weighted number) of white pixels of the rows for the pixel locations to divide the image along the greatest gap or area of white space.

If (at block 118) the number of white pixels (or weighted number) in the column or row of the determined pixel location (from blocks 110 or 116) is less than a minimum number of white pixels, then the considered image 8 or subimage 10 is returned (at block 120) to include in the image file 12. In this way, if the subimage or image does not have a sufficiently large gap, or region of white space, then the image 8 or subimage 10 is not divided. The minimum number of white pixels used to determine whether to divide may comprise a user set predetermined value. If (at block 118) the number of white pixels in the column or row extending through the determined pixel location is greater than the minimum number of white pixels, i.e., the white space or gap is sufficiently large, then control proceeds to block 130 in FIG. 4b. Otherwise, if the number of white pixels 9 at block 118) is not sufficient, then the image 8 or subimage 10 is split in half and control proceeds (at block 122) to block 132 in FIG. 4b. The operation at block 120 occurs if an optimal place to split cannot be located, so the image processor 4 splits the image 8 or subimage 10 in half to try to further remove white space. In an alternative embodiment, instead of splitting in half along a vertical axis, it may try to ensure that the width of one of the subimages is a multiple of 8 pixels, to aid in efficient storage.

With respect to FIG. 4b, the image processor 4 divides (at block 130) the selected image 8 or subimage 10 into two subimages at the axis extending through and orthogonal with respect to the determined pixel location on the horizontal or vertical axis. The image processor 4 then performs the loop of operations at blocks 132 to 142 for each subimage 10 generated at block 130. At block 134, the image processor 4 determines the smallest rectangle that encloses all non-white pixels in the subimage and then crops the subimage to that smallest rectangle, setting the subimage to the smallest rectangle. In this way, as many white pixels are removed from the subimage as possible to eventually determine the smallest tiles, of acceptable minimum size, that include all the non-white pixels in the image 8. If (at block 136) the subimage 10 is less than a minimum image size, then the generated subimage 10 is returned (at block 138) to include in the image file 12. The minimum image size is used to prevent further division of a subimage to create too many small images, which can be inefficient to process. The user may set the minimum image size to a desired level to balance the benefits of excluding further white space, i.e., reducing the image file 12 size versus the additional processing needed to manage and process additional smaller images. For instance, by way of example, the minimum image size may be set to 100 or 200 pixels. If (at block 136) the generated subimage 10 is larger than the minimum image size, then the image processor 4 recursively performs (at block 140) an iteration of the operations at blocks 104-142 for the generated subimage as the selected image.

In the described embodiment of FIGS. 4a and 4b, a comparison of the width to the height of the image was used to determine whether to divide the image along the horizontal or vertical axis. In an alternative embodiment, different techniques may be used to determine whether to divide the image horizontally or vertically. For instance, in an alternative embodiment, the image processor 4 may generate both horizontal and vertical histograms to determine one pixel location on the horizontal and vertical axes whose column or row satisfies a condition with respect to the number of white pixels in the columns and rows extending through the pixel locations on the horizontal and vertical axes. For instance, the image processor 6 may look at a number of white pixels or weighted number of white pixels, as discussed above, across the columns and rows extending through the pixel locations on both the horizontal and vertical axes to determine the column or row having a maximum number of weighted (or non-weighted) white pixels. The determined pixel location comprises the pixel location whose column or row includes the maximum number of weighted (or non-weighted) white pixels across both columns and rows. In a further alternative embodiment, the image processor 8 may use a combination of tests to divide horizontally if the width and height ratio exceeds a threshold and consider both horizontal and vertical histograms if the width does not exceed the threshold.

With the described operations of FIGS. 4a and 4b, the histograms 14 are used to find an optimal place to split the images by finding areas with large amounts of white space, splitting the images in two and then cropping the white space from the margins of the new subimages.

Figure 5:
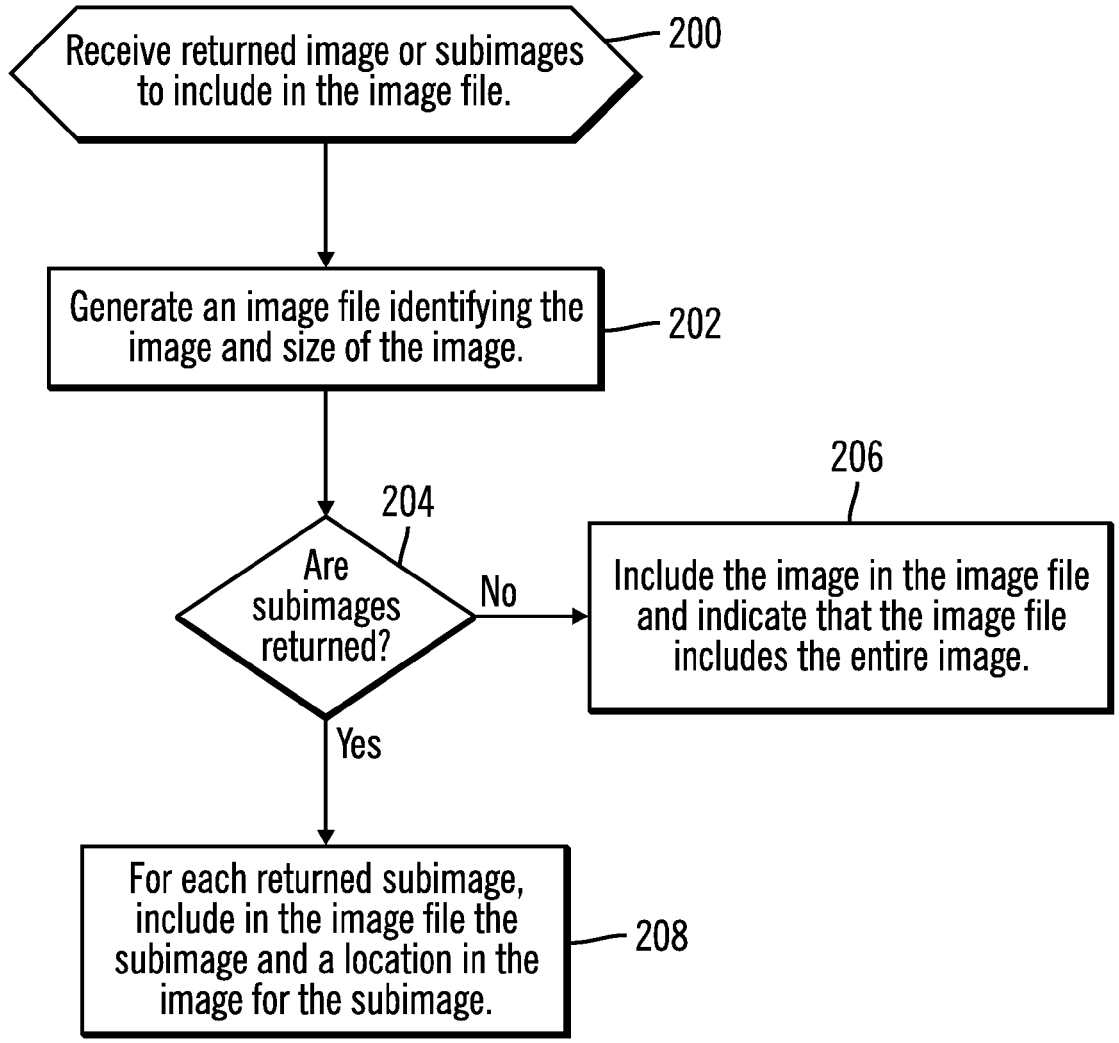
FIG. 5 illustrates an embodiment of operations to generate an image file from a returned image or subimages.

FIG. 5 illustrates an embodiment of operations performed by the image processor 4 to generate the image file 12 from the image 8 or subimages 10 returned by the operations of FIGS. 4a and 4b. Upon receiving (at block 200) the returned image 8 or subimages 10 at block 136 (FIG. 4b) to include in the image file 12, the image processor 4 generates (at block 202) the image file 12 identifying the image 8 in field 30 and the image size 32. If (at block 204) no subimages 10 are returned, i.e., only the image 8 itself is returned, then the image 8 is included (at block 206) in the image file 12 and the image processor 4 may indicate that the image file 12 includes the entire image 8. If block 206 is processed, then there is no compression by dividing the image 8 into multiple subimages 10. If (at block 204) subimages 10 are returned, then for each returned subimage 10, the image processor 4 includes (at block 208) the subimage 10 in the image file 12 in fields 34a . . . 34n and a location 36a . . . 36n, i.e., pixel coordinates, in the image where the subimage 10 tile is located. In this way, the subimages 10 cover non-overlapping pixels in the image. By including subimages, the image file 12 requires fewer bytes than the entire image 8 because pixel bits are not needed to indicate white pixel values. Those areas of the image 8 that lie outside of any subimage 10 comprise white space. Further, the generated images may be of different sizes.

Figure 6:
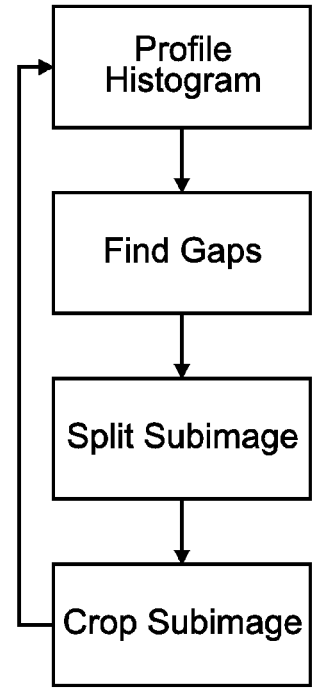
FIG. 6 illustrates an example of an image.
Figure 6:
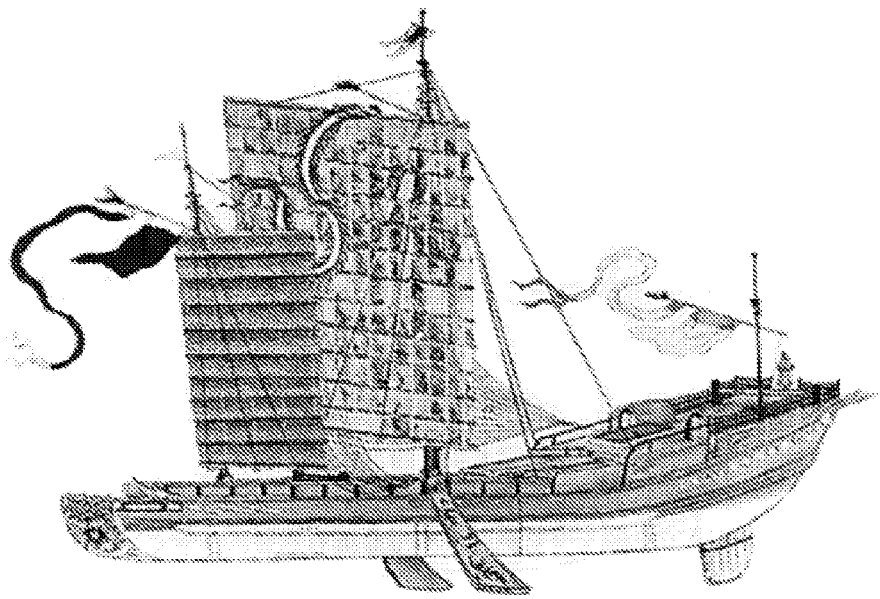

FIG. 6 illustrates an example of an image 300, such as image 8, comprised of a bitmap or other data structure indicating values for all the pixel locations.

Figure 7:
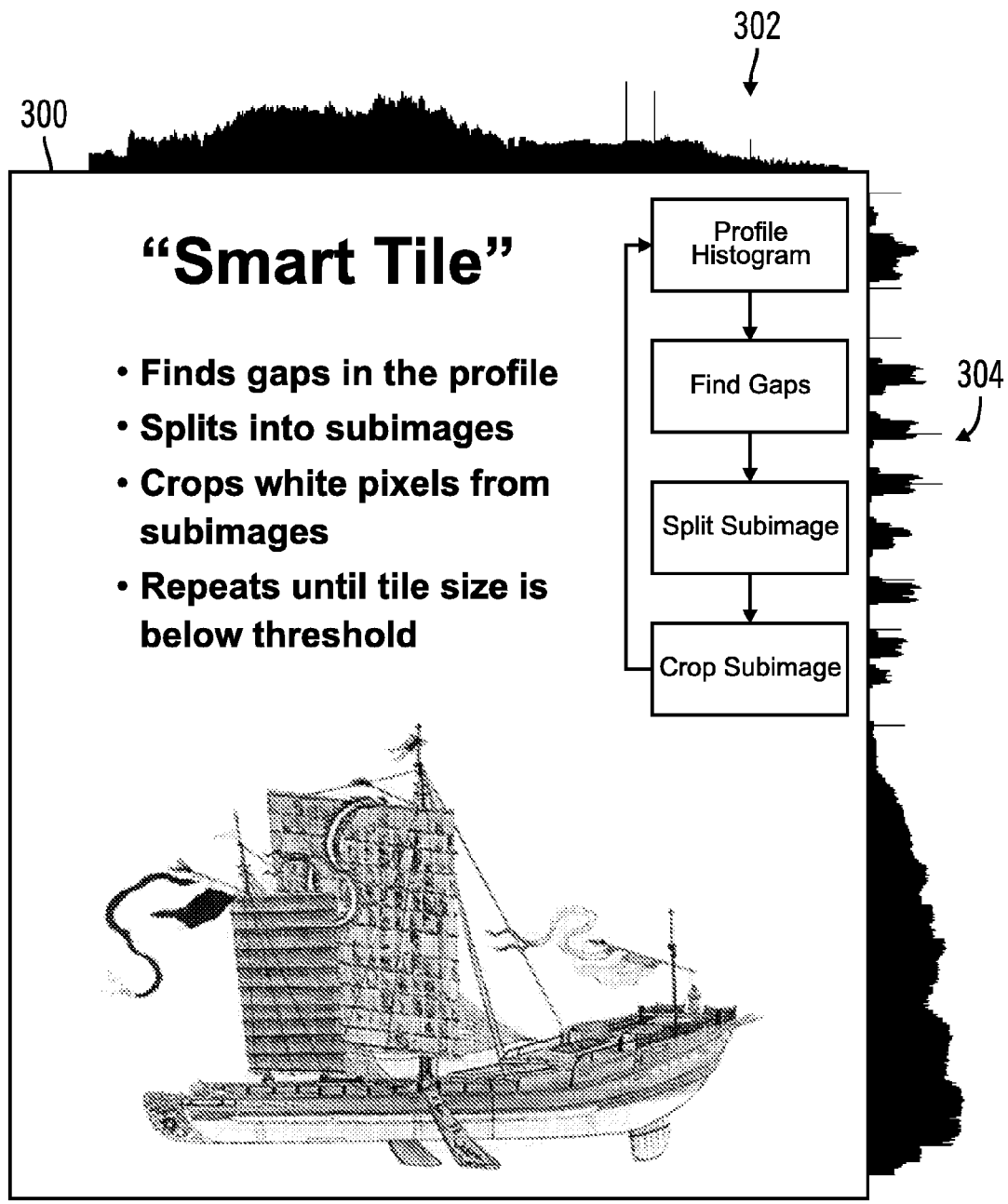
FIG. 7 illustrates an example of vertical and horizontal histograms with respect to the image of FIG. 6.

FIG. 7 illustrates an example of a graphical rendering of horizontal histogram 302 and vertical histogram 304 showing the number of non-white pixels in each column of the image 300 extending through pixel locations on the horizontal axis. For instance, for pixel locations having columns extending through the mast and the boxes of text, show a relatively high number of non-white pixel values. Those values in the distribution with a low number of non-white pixels on the y axis comprise have larger gaps of white space. The histogram 14 data structures may indicate either non-white or white pixels for each pixel location, and the image processor 4 would process that information to determine an axis through the pixel location having the maximum number of white pixels or alternatively a minimum number of non-white pixels, which may be weighted by a distance from a center of the image, to determine where to split the image.

Figure 8:
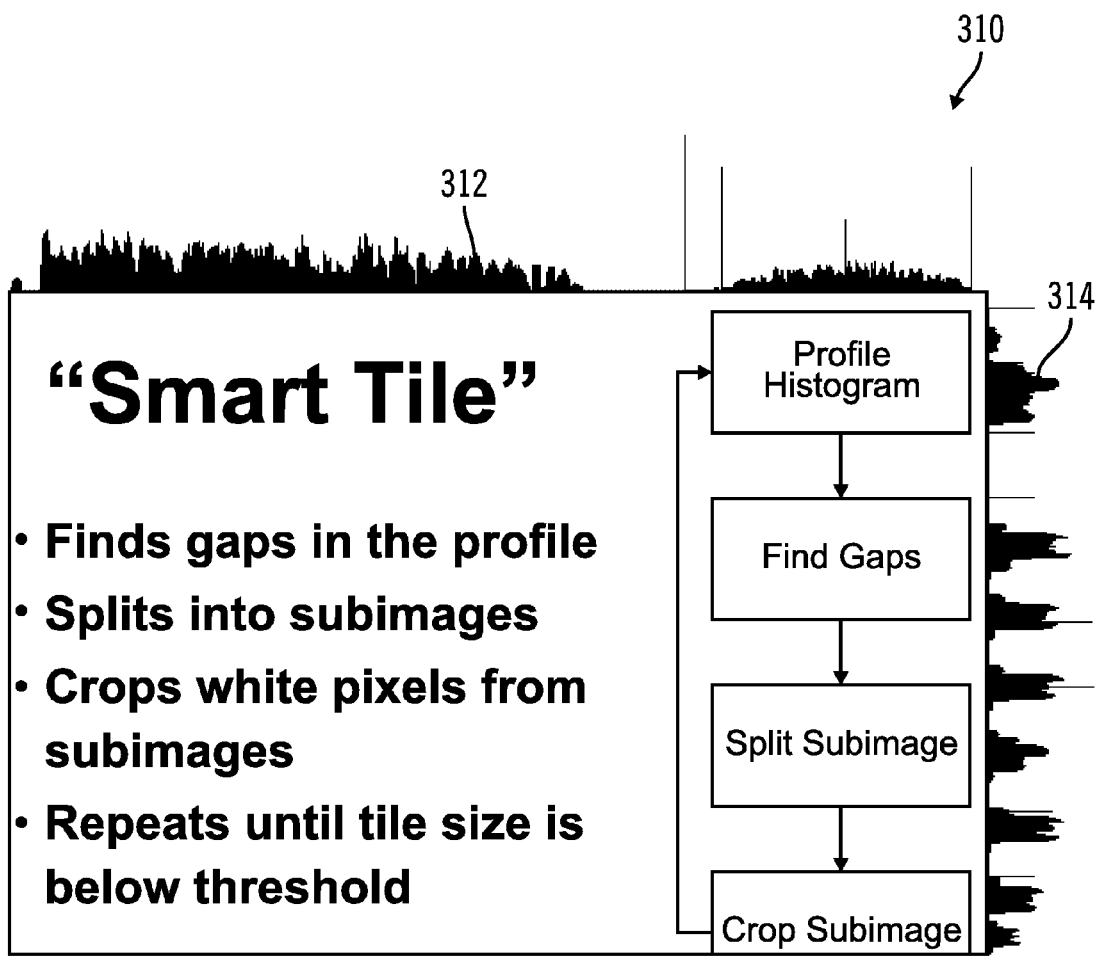
FIG. 8 illustrates an example of a subimage formed by horizontally splitting the image in FIGS. 6 and 7.

FIG. 8 illustrates an example of a subimage 310 generated by splitting the image 300 at a pixel location on the vertical axis having a maximum amount of white space and weighted by closeness to the center. The subimage 310 is the upper half of the image 300 split horizontally at a pixel location on the vertical axis. New histograms 312 and 314 are generated for the new subimage 310 to use to determine where to further split the subimage 310.

Figure 9:
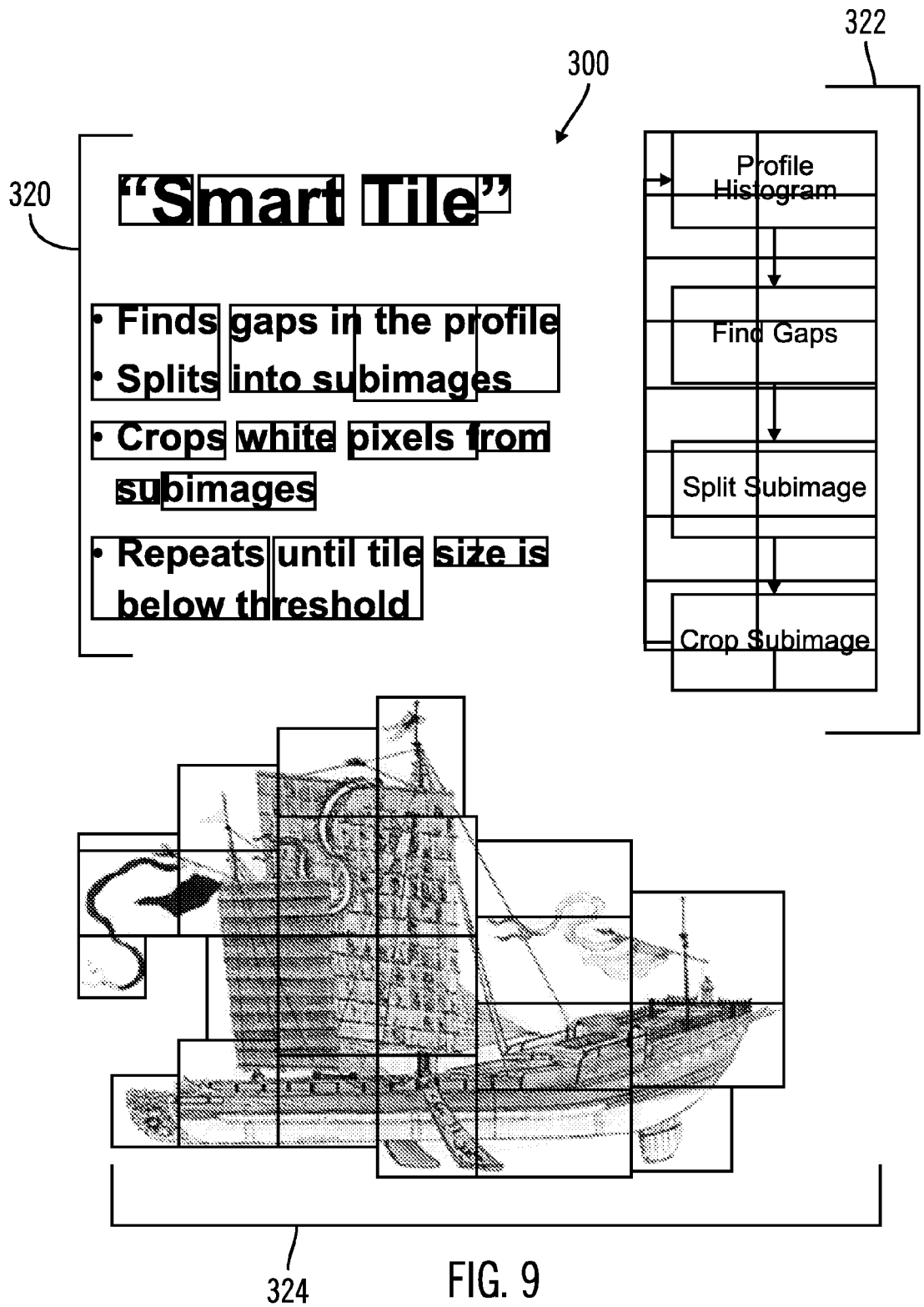
FIG. 9 illustrates an example of how subimages may be formed comprising tiles of the image.

FIG. 9 illustrates an example of how subimages are formed from the image 300 shown as the boxed non-white values, such as subimage boxes surrounding text 320, surrounding the text boxes 322. Further, subimage boxes are formed to cover certain parts of the ship 324 that exclude white space.

In a further embodiment, tiles that collectively cover a rectangular region with no white space between the tiles (where the method fails to find white space to be excluded) may be recombined into a single tile to avoid the overhead of processing many small subimages.

The described embodiments reduce the amount of data required to represent an image to conserve storage space, improve transmission of the image to an output device, and to improve output device processing times. The described embodiments provide a technique to generate subimages 10 of an image that cover areas of non-white pixels and exclude white pixels to minimize the pixel locations for which values are maintained in the image file 12. The image processor performs a search over the image to find sets of subimages, or tiles, that enclose all the significant pixels of the image while trying to exclude as many background pixels as possible. In this way, the described embodiments provide techniques to compress the space needed to represent an image 8 by storing subimages 10 whose combination in the image file 12 requires less space than used by the image 8 itself in order to reduce the cost of storage and transmission of an image.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable storage medium", where a processor may read and execute the code from the computer readable medium. A computer readable storage medium may comprise storage media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The "article of manufacture" may comprise a transmitting station and/or a receiving station for transmitting and receiving transmission signals in which the code or logic is encoded, where the code or logic encoded in the transmission signal may be decoded and stored in hardware or a computer readable storage medium at the receiving and transmitting stations or devices. An "article of manufacture" comprises a computer readable storage medium, hardware device, and/or transmission transmitters or receivers in which code or logic may be implemented. Those skilled in the art will recognize that many modifications may be made to this configuration without departing from the scope of the present invention, and that the article of manufacture may comprise suitable information bearing medium known in the art.

In an alternative embodiment, the image processor 4 may split an image 8 or subimage 10 into two further subimages exactly halfway along the horizontal or vertical axis and then crop any white space from the outsides of the two subimages, then repeats the process on each of the subimages until all the subimages are below a minimum size.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4a, 4b and 5 certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    determining a pixel location on one axis of an image comprising a plurality of pixels;
    dividing the image into multiple subimages at the determined pixel location on the axis;
    determining whether each subimage can be cropped to remove regions of white pixels from the subimage;
    cropping each subimage to remove a region of white pixels in response to determining that the subimage can be cropped; and
    generating an image file defining the image including the subimages.

2. The method of claim 1, wherein determining the pixel location comprises:
    processing the image to generate a histogram providing a distribution of pixels having white values at each pixel location on one axis of the image; and
    processing the histogram to determine one pixel location on the axis based on a number of white pixels in columns or rows of the image extending through the pixel locations on the axis.

3. The method of claim 2, further comprising:
    recursively performing an iteration of the operations of processing the subimages resulting from the dividing to generate the histogram, processing the histogram to determine the pixel location based on the number of white pixels in the columns or rows extending through pixel locations on the axis, and dividing the image on the axis at the determined pixel location to generate a plurality of subimages, wherein the image file includes the subimages determined by performing multiple recursive iterations of the operations on the subimages.

4. The method of claim 3, further comprising:
    determining whether the subimage is greater than a minimum size, wherein the recursive iteration of operations is performed on one subimage in response to determining that the subimage is greater than the minimum size, and wherein the recursive iteration of the operations is not performed on the subimage in response to determining that the subimage is less than the minimum size, wherein the subimage less than the minimum size is included in the image file.

5. The method of claim 3, wherein determining the pixel location based on the number of white pixels in the columns or rows extending through the pixel location on the axis comprises determining the pixel location having a column or row extending through the pixel location on the axis that has a maximum number of white pixels of the columns or rows of the image extending through pixel locations on the axis, further comprising:

determining whether the number of white pixels in the column or row extending through the determined pixel location is greater than a minimum number of white pixels, wherein the subimage is divided in response to determining that the number of white pixels in the column or row extending through the determined pixel location is greater than the minimum number and wherein the subimage is not divided in response to determining that the determined number of white pixels is less than the minimum number.

6. The method of claim 2, wherein a number of pixels of the subimages is less than a number of pixels in the image, wherein the image file indicates a location of each included subimage in the image, and wherein portions of the image not covered by one subimage comprise white space.

7. The method of claim 2, wherein processing the histogram comprises:

determining a number of white pixels in columns or rows of the image extending through the pixel locations on the axis; and weighting each determined number of pixels for the columns or the rows of the image based on the pixel location distance from a center of the axis, wherein the determined pixel location comprises the pixel location whose row or column has a maximum number of the determined numbers for the columns or rows.

8. The method of claim 7, wherein the weighting of each determined number of white pixels decreases as the pixel location moves further away from the center of the axis.

9. The method of claim 2, wherein generating the histogram further comprises:

generating a horizontal histogram providing a distribution of non-white pixels in columns of the image extending through pixel locations on a horizontal axis of the image;

wherein processing the histogram comprises processing the horizontal histogram to determine one pixel location on the horizontal axis based on the number of white pixels in the columns extending through the pixel locations on the horizontal axis, wherein the image is divided at the determined pixel location.

10. The method of claim 2, further comprising:

determining whether to divide the image on a horizontal or a vertical axis, wherein the horizontal histogram is used to determine one pixel location on the horizontal axis at which to divide the image on the vertical axis extending through the determined pixel location in response to determining to divide the image on the vertical axis; and in response to determining to divide the image on the horizontal axis, generating a vertical histogram providing a distribution of non-white pixels in rows of the image extending through pixel locations on a vertical axis of the image, wherein processing the histogram comprises processing the vertical histogram to determine one pixel location on the vertical axis based on the number of white pixels in rows extending through the pixel locations on the vertical axis, wherein the image is divided on the horizontal axis extending through the determined pixel location on the vertical axis.

11. The method of claim 10, wherein determining whether to use the vertical or horizontal histogram comprises:

determining one pixel location on the horizontal and vertical axes whose column or row satisfies a condition with respect to the number of white pixels in the columns and rows extending through the pixel locations on the horizontal and vertical axes, wherein the image is divided at the determined pixel location on one of the horizontal or vertical axis.

12. The method of claim 10, wherein determining whether to use the vertical or horizontal histogram comprises:

determining whether a width of the image is greater than a height of the image by a predetermined factor, wherein the horizontal histogram is used in response to determining that the width of the image is greater than the height by the predetermined factor and the vertical histogram is used in response to determining that the width of the image is less than the height by the predetermined factor.

13. A system, comprising:

a computer readable storage media including an image;

an image processor in communication with the computer readable storage media, wherein the image processor performs operations, the operations comprising:

determining a pixel location on one axis of the image comprising a plurality of pixels;

dividing the image into multiple subimages in the computer readable storage media at the determined pixel location on the axis;

determining whether each subimage can be cropped to remove regions of white pixels from the subimage;

cropping each subimage to remove a region of white pixels in response to determining that the subimage can be cropped; and generating an image file in the computer readable storage media defining the image including the subimages.

14. The system of claim 13, wherein determining the pixel location comprises:

processing the image to generate a histogram providing a distribution of pixels having white values at each pixel location on one axis of the image; and processing the histogram to determine one pixel location on the axis based on a number of white pixels in columns or rows of the image extending through the pixel locations on the axis.

15. The system of claim 14, wherein the operations further comprise:

recursively performing an iteration of the operations of processing the subimages resulting from the dividing to generate the histogram, processing the histogram to determine the pixel location based on the number of white pixels in the columns or rows extending through pixel locations on the axis, and dividing the image on the axis at the determined pixel location to generate a plurality of subimages, wherein the image file includes the subimages determined by performing multiple recursive iterations of the operations on the subimages.

16. The system of claim 15, wherein determining the pixel location based on the number of white pixels in the columns or rows extending through the pixel location on the axis comprises determining the pixel location having a column or row extending through the pixel location on the axis that has a maximum number of white pixels of the columns or rows of the image extending through pixel locations on the axis, and wherein the operations further comprise:

determining whether the number of white pixels in the column or row extending through the determined pixel location is greater than a minimum number of white pixels, wherein the subimage is divided in response to determining that the number of white pixels in the column or row extending through the determined pixel location is greater than the minimum number and wherein the subimage is not divided in response to determining that the determined number of white pixels is less than the minimum number.

17. An article of manufacture including code executed to perform operations, the operations comprising:
   determining a pixel location on one axis of an image comprising a plurality of pixels;
   dividing the image into multiple subimages at the determined pixel location on the axis;
   determining whether each subimage can be cropped to remove regions of white pixels from the subimage;
   cropping each subimage to remove a region of white pixels in response to determining that the subimage can be cropped; and
   generating an image file defining the image including the subimages.

18. The article of manufacture of claim 17, wherein determining the pixel location comprises:
   processing the image to generate a histogram providing a distribution of pixels having white values at each pixel location on one axis of the image; and
   processing the histogram to determine one pixel location on the axis based on a number of white pixels in columns or rows of the image extending through the pixel locations on the axis.

19. The article of manufacture of claim 18, wherein the operations further comprise:
   recursively performing an iteration of the operations of processing the subimages resulting from the dividing to generate the histogram, processing the histogram to determine the pixel location based on the number of white pixels in the columns or rows extending through pixel locations on the axis, and dividing the image on the axis at the determined pixel location to generate a plurality of subimages, wherein the image file includes the subimages determined by performing multiple recursive iterations of the operations on the subimages.

20. The article of manufacture of claim 19, wherein determining the pixel location based on the number of white pixels in the columns or rows extending through the pixel location on the axis comprises determining the pixel location having a column or row extending through the pixel location on the axis that has a maximum number of white pixels of the columns or rows of the image extending through pixel locations on the axis, and wherein the operations further comprise:
   determining whether the number of white pixels in the column or row extending through the determined pixel location is greater than a minimum number of white pixels, wherein the subimage is divided in response to determining that the number of white pixels in the column or row extending through the determined pixel location is greater than the minimum number and wherein the subimage is not divided in response to determining that the determined number of white pixels is less than the minimum number.

* * * * *